United States Patent [19]

Lovelock

[11] Patent Number: 4,919,690
[45] Date of Patent: Apr. 24, 1990

[54] METHOD FOR PURIFYING A CONTINUOUS FLOW OF HELIUM AND/OR NEON GAS

[75] Inventor: James E. Lovelock, St. Giles on the Heath, Great Britain

[73] Assignee: Hewlett-Packard Company, Palo Alto, Calif.

[21] Appl. No.: 133,231

[22] Filed: Dec. 17, 1987

Related U.S. Application Data

[63] Continuation-in-part of Ser. No. 18,144, Feb. 24, 1987, abandoned.

[30] Foreign Application Priority Data

Apr. 16, 1986 [GB] United Kingdom ............... 8609325

[51] Int. Cl.$^5$ ................................................ B03C 1/00
[52] U.S. Cl. ............................................ 55/2; 55/131
[58] Field of Search ...................... 55/2, 66, 129–131, 55/154

[56] References Cited

U.S. PATENT DOCUMENTS

| 1,333,790 | 3/1920 | Bradley | 55/129 |
| 2,000,020 | 5/1935 | Heinrich | 55/2 |
| 3,154,682 | 10/1964 | Hartz et al. | 55/131 |
| 4,313,739 | 2/1982 | Douglas-Hamilton | 55/2 |

FOREIGN PATENT DOCUMENTS

| 544386 | 2/1932 | Fed. Rep. of Germany | 55/66 |
| 31936 | 6/1927 | France | 55/2 |
| 1111821 | 9/1984 | U.S.S.R. | 55/2 |
| 381631 | 10/1932 | United Kingdom | 55/129 |
| 882977 | 11/1961 | United Kingdom . | |
| 885735 | 12/1961 | United Kingdom . | |
| 1074710 | 7/1967 | United Kingdom . | |
| 1117789 | 6/1968 | United Kingdom . | |
| 1185694 | 3/1970 | United Kingdom . | |
| 1501965 | 2/1978 | United Kingdom . | |
| 1532017 | 11/1978 | United Kingdom . | |
| 1561822 | 3/1980 | United Kingdom . | |
| 2050196 | 1/1981 | United Kingdom . | |
| 1584484 | 2/1981 | United Kingdom . | |
| 1597623 | 9/1981 | United Kingdom . | |

*Primary Examiner*—Bernard Nozick
*Attorney, Agent, or Firm*—Richard F. Schuette

[57] ABSTRACT

Continuous production of ultra-pure helium and neon gases is achieved by utilizing the fact that these gases have the highest ionization and excitation potentials of all chemical substances. The helium/neon gas stream to be purified is excited by, for example, a corona discharge not only to directly ionize some of the impurities but also to produce noble gas ions and metastable atoms. These ions and metastables subsequently collide with and ionize impurities. A polarizing field is used to draw the impurity ions out of the main gas flow and into a subsidiary flow bled from the main flow. In a preferred embodiment, the polarizing field is established between a central rod-shaped anode (13) and a surrounding tubular cathode (10) through which the main gas flow passes. The cathode is made of a porous material so that positive impurity ions can be removed by the radial outwards flow of gas therethrough.

3 Claims, 1 Drawing Sheet

METHOD FOR PURIFYING A CONTINUOUS FLOW OF HELIUM AND/OR NEON GAS

CROSS REFERENCE TO RELATED APPLICATION

This application is a continuation-in-part of application Ser. No. 018,144, filed on 2/24/87, now abandoned.

BACKGROUND OF THE INVENTION

The present invention relates to a method and apparatus for purifying a continuous flow of noble gas; in particular, but not exclusively, the invention is concerned with the continuous production of ultra pure helium or neon (or mixtures thereof) where "ultra pure" means that contamination with any impurity gas or gases is less than one part in ten million by volume. Helium and neon gases of this purity have many uses including as sample carrier gas in modern analytical techniques, filling gases for discharge tubes and lasers, and purge gases in the semiconductor industry.

DESCRIPTION OF THE PRIOR ART

Many processes are known for purifying continuous streams of gases. U.S. Pat. No. 4,313,739 (Douglas-Hamilton) describes one process which is based on preferential ionization of contaminant molecules, and involves the steps of passing a stream of the gas to be purified along a predetermined flow path; ionizing impurities in the gas; and removing the positive impurity ions from the main gas flow by setting up a polarizing field across said stream to cause migration of said impurity ions out of the main gas flow. In this process, the impurities, are ionized by using a corona discharge to generate ions and electrons in the gas which then exchange charge with impurity molecules. Of course, this method only works where the impurity molecules have a lower ionization potential than the molecules of the gas to be purified. Furthermore, the efficiency of the overall process is poor, not least because the ions and electrons required to ionize the impurity are continuously removed from the gas flow by the polarizing field.

It is an object of the present invention to provide a relatively efficient method for the production of ultra pure helium and neon gases on a continuous basis and in a manner relatively easy to implement.

SUMMARY OF THE INVENTION

According to one aspect of the present invention, there is provided a method of purifying a continuous flow of a noble gas or a mixture of such gases, said method involving the operations of passing a stream of the gas to be purified along a predetermined flow path ionizing impurities in the gas by exciting the gas stream in such a manner as to favor the production of noble gas metastable atoms, said metastable atoms serving to ionize said impurities by losing energy thereto, and removing the positive impurity ions from the main gas flow by setting up a polarizing field across said stream to cause migration of said impurity ions out of the main gas flow.

The effectiveness of this purification method rests in the high excitation potentials of noble gas metastables. In particular, the metastable excitation potential of helium or neon is greater than the ionization potentials of any impurities. In addition, these metastables, being neutral, are not removed from the gas stream by the polarizing field. Furthermore, the noble gas metastables readily lose their stored energy to impurity molecules they encounter by collision leaving the noble gas as uncharged, unexcited atoms. The ionizing effect of noble-gas "metastable" atoms is, of course, itself a known effect (see UK Patent Specification No. 882,997) though not previously used in the purification of noble gases.

The excitation of the gas stream will generally also result in the direct production of impurity ions and also in the production of noble gas ions, which, in turn, cause ionization of impurities. However, these latter processes are considerably less efficient at ionizing impurities than by generation of metastables.

Preferably, metastable creation is effected by using some appropriate means such as a Townsend or glow discharge, to generate free electrons in the gas stream and setting the polarization field such that the average energy of these electrons between collisions with noble gas atoms is such as to favor metastable excitation rather than ion production.

According to another aspect of the present invention, there is provided apparatus for purifying a continuous flow of noble gas or a mixture thereof, said apparatus comprising:
an inlet for the gas to be purified;
an outlet for purified gas;
means defining an elongate gas flow path between said inlet and outlet;
exhaust means for bleeding of a subsidiary flow of gas from the main gas flow passing along said gas flow path;
means for exciting the gas stream in such a manner as to favor the production of noble gas metastable atoms, said metastable atoms subsequently ionizing the impurities in the gas; and
polarizing-field means operative to generate a polarizing field across the gas flow path for drawing positive impurity ions out of the main gas flow and into said subsidiary flow for removal through said exhaust means.

Preferably, the means for exciting the gas stream to produce noble-gas metastables includes both means for providing electrons in the gas stream and means for accelerating these electrons to give them a mean energy between collisions with gas-stream molecules, sufficient to generate noble-gas metastables but less than that required to generate noble-gas ions. The electron accelerating means can be constituted by said polarizing-field means, the voltage of the latter being set to impart the appropriate mean collision energy to the electrons (the actual voltage value will depend on gas pressure and temperature and the spacing and geometry of the electrodes establishing the field).

BRIEF DESCRIPTIONS OF THE DRAWING

A helium gas purifier embodying the invention will now be described by way of non-limiting example with reference to the accompanying diagrammatic drawing, the sole FIGURE of which is a longitudinal cross-section through the purifier.

DESCRIPTION OF THE PREFERRED EMBODIMENTS

Figure 1:
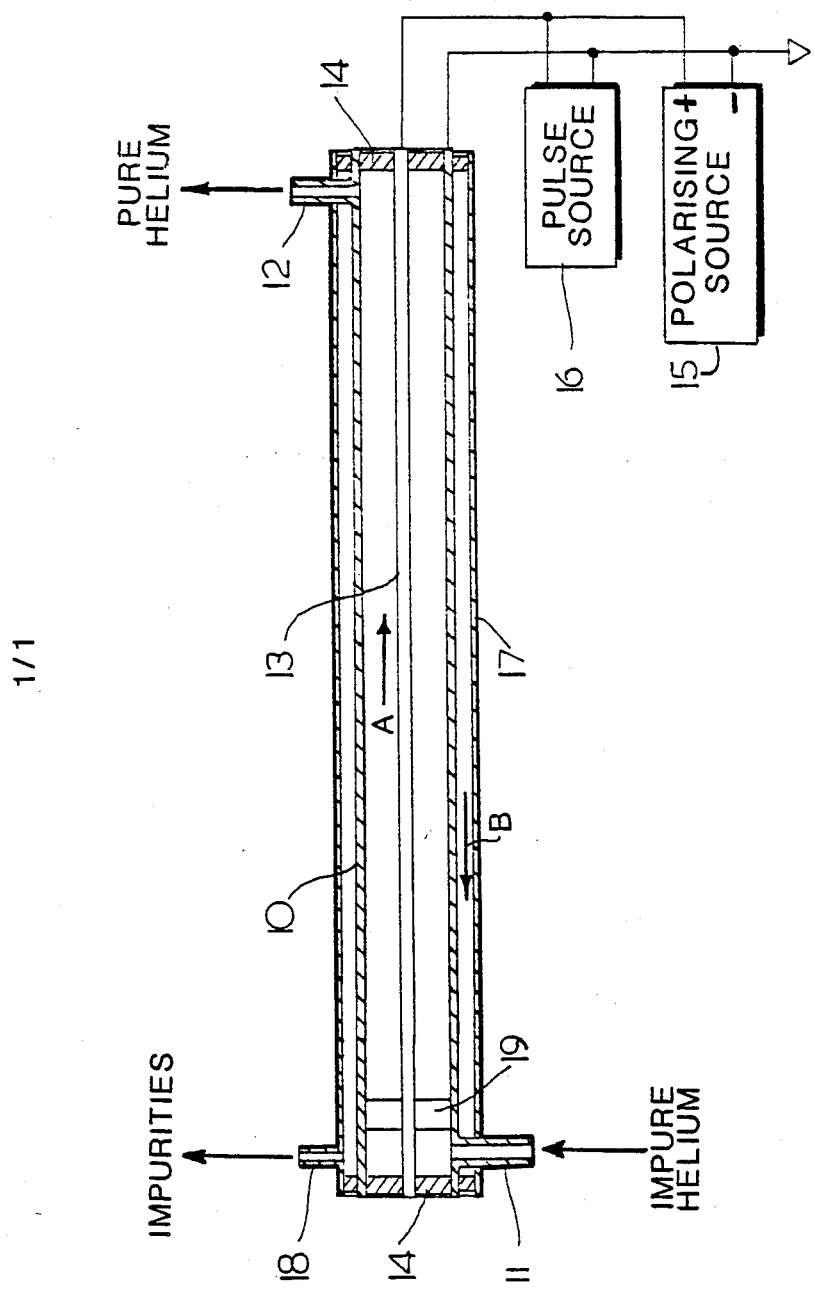

Although the purifier to be described is suitable for purifying noble gases individually or in mixture, for ease of explanation, the following description will be given in terms of the purification of a helium gas flow only.

As shown in the drawing, the purifier comprises a tubular member 10 defining a main gas flow path between an inlet 11 for impure helium and an outlet 12 for purified helium. The tubular member 10 is formed of a porous conducting material such as sintered metal or sintered metallized glass or quartz. The tubular member 10 constitutes a cathode of the purifier, the complementary anode 13 being formed by a metal rod positioned coaxially in the tubular cathode 10 by insulating end seals 14.

A polarizing field is set up between the anode 13 and cathode 10 by a DC polarizing source 15. This source 15 applies a potential between the anode and cathode which is substantially less than would cause an arc or discharge in helium at the pressure existing within the purifier during operation (generally slightly above atmospheric pressure); the applied potential is, however, sufficient to cause a rapid migration of any positive ions present to the cathode 10.

In order to generate helium metastables for ionizing impurities in the gas flowing through the cathode 10, a pulse source 16 is provided for supplying high frequency (100 kHz to 50 MHz), high potential, short duration (less than one microsecond) pulses between the anode and cathode whereby to set up an ionizing discharge between the electrodes. Such an arrangement is disclosed in UK Patent Specification No. 1,597,623; and will not, therefore, be further described herein except to note that since to initiate a discharge at least one ion or electron must be present, it is prudent to provide some means for generating the required ion or electron (although background radiation could be relied upon). Consequently, the polarizing source could be made adjustable to cause an initial discharge before being set back to its normal operating potential.

Surrounding the tubular cathode 10 is a cylindrical jacket 17 for collecting gas which, in operation, passes radially outwards through the porous cathode 10. This jacket 17 has an exhaust port 18 adjacent the inlet end of the main gas flow path defined by the cathode 10.

A diffuser 19 is provided in the main gas flow path adjacent to inlet 11 to establish streamline flow down the inside of the cathode 10.

In operation, impure helium (typically, one part per million impurity) is supplied to the inlet 11 at a slight over-pressure relative to surrounding atmosphere to establish a streamlined main gas flow coaxially down the inside of the cathode 10 in the direction of arrow A to the outlet 12. Due to the porous nature of the cathode 10, a small subsidiary gas flow is set up that passes radially outwards through the cathode and then in the direction of the arrow B to the exhaust port 18.

The discharge established between the anode 13 and cathode 10 by the pulse source 16 results in the production of ions and free electrons. The electrons are accelerated by the polarizing fields towards the anode 13 and collide repeatedly during their journey with helium atoms. The polarizing voltage is set such that the mean energy gained by these electrons between collisions is sufficient to excite the helium atoms to their metastable state (21 eV) but is insufficient to ionize these atoms (<24 eV). As a result the production of helium metastables is favored. The actual polarizing voltage required will depend on gas pressure and the spacing of the anode 13 and cathode 10 but is readily determined empirically since the efficiency of the purifying process falls off rapidly if the polarizing voltage is too high or too low.

The excitation energy of helium metastables is greater than the ionization energy of any impurities that may be present in the main gas stream. As a result, upon an impurity molecule colliding with a helium metastable, the former is ionized. This ionization process is highly efficient not least because the metastable atoms are neutral and are not removed from the main gas stream by the polarizing field.

In addition to the primary impurity-ionization mechanism involving the helium metastables, some impurity molecules will be ionized by the discharge itself, by electron impact, and by ultra-violet radiation emitted form helium metastables transitory to their unexcited state.

The polarizing field setup between the anode 13 and cathode 11 by the polarizing source 15 causes positive impurity ions to migrate to the cathode where they pass out of the main gas stream through the porous cathode 11 as part of the subsidiary gas flow.

The purified helium typically with an impurity level of less than one part in ten million exits the purifier through the outlet 12 while the impurities are exhausted through exhaust port 18.

The actual dimensions of the purifier will depend upon the desired flow rate of helium and the degree of purity sought. However, typical dimensions would be a tube 10 mm in internal diameter with a length of 0.3 meters.

An ion current of 4.3 microamperes would be needed to remove all of a one part per million impurity in helium flowing at one milliliter per second at N.T.P. This assumes that all of the ion current is carried by impurity ions and that the impurities are completely removed from the main helium flow after the impurity ions encounter the cathode. In practice, ionizing efficiencies of 1 to 10% are more usual.

The purifier can be thought of as analogous to a distillation column with gaseous diffusion processes tending to hinder the smooth operation of the separation. For a cathode 10 mm in internal diameter and an anode 2 mm diameter and with the flow rate and impurity level quoted in the preceding paragraph, each 5 to 10 mm section of the purifier corresponds to a plate of a distillation column and 67% of impurity will be removed in each of the sections. Thus, five sections should theoretically remove about 99% of the impurity. A typical purifier is in fact 0.3 m or more in length to extend the range of purification and the maximum flow rate.

The structural and electrical characteristics of the purifier are preferably such as to avoid the development of ion densities in the purifier in the plasma region. In plasma, ions and electrons are closely associated in a gaseous cloud and the ions cannot be so readily moved to the electrodes by the applied polarizing field. For a 10 mm section of purifier, with a cathode having an internal diameter of 10 mm, the polarizing field current should not exceed one microampere if plasma conditions are to be avoided.

It will be appreciated that various modifications can be made to the described form of purifier. Thus, instead of providing an ionizing source in the form of a discharge device, other forms of ionizing source could be employed such as, for example, a radioactive source located within the cathode 10, an ultraviolet source generated by a subsidiary discharge, an external X-ray source or a gamma-ray source.

Furthermore, whilst the use of a porous cathode is a particularly convenient and efficient way of removing the impurity atoms and molecules, it would be possible to use a non-porous cathode and then to separate off from the main gas flow, the gas stream that passes directly over the cathode and within which the neutralized impurities will be concentrated.

As previously mentioned, the described method and apparatus are suitable for purifying the other noble gases and mixtures of these gases. However, the purification process is most suitable for helium and neon since their metastable energies exceed the ionization potentials of all impurities which may not be the case for the other noble gases.

I claim:

1. A method for removing any atoms or molecules which are not either helium or neon from a continuous flow of helium or neon gas, or a mixture of said gases, said method involving the operations of:

passing a stream of the helium or neon gas along a predetermined flow path;

generating a corona discharge across the stream by applying a series of high frequency, high potential, short duration pulses sufficient to raise the mean energy of the stream to between 21 eV and 24 eV, wherein, metastable helium or neon atoms are produced, said metastable atoms serving to ionize other atoms or molecules which are not either helium or neon by losing energy thereto; and removing the ionized atoms or molecules from the main gas stream by setting up a polarizing field across said stream to cause migration of said other ions out of the stream.

2. A method according to claim 1, wherein said pulse frequency is between 100 KHz and 50 mHZ.

3. A Method according to claim 1, wherein said pulse duration is less than one micro second.

* * * * *